(12) United States Patent
Ains

(10) Patent No.: US 8,557,153 B2
(45) Date of Patent: Oct. 15, 2013

(54) METHOD FOR PRODUCING AT LEAST ONE RAISED AREA ON A PLASTIC CONTAINER

(75) Inventor: Yannick Ains, Magnac sur Touvre (FR)

(73) Assignee: Britton Decorative, L'Isle d'Espagnac (FR)

( * ) Notice: Subject to any disclaimer, the term of this patent is extended or adjusted under 35 U.S.C. 154(b) by 399 days.

(21) Appl. No.: 12/989,894

(22) PCT Filed: Apr. 24, 2009

(86) PCT No.: PCT/FR2009/050766
§ 371 (c)(1),
(2), (4) Date: Oct. 27, 2010

(87) PCT Pub. No.: WO2009/138677
PCT Pub. Date: Nov. 19, 2009

(65) Prior Publication Data
US 2011/0039046 A1    Feb. 17, 2011

(30) Foreign Application Priority Data
Apr. 30, 2008  (FR) ..................................... 08 52939

(51) Int. Cl.
*B29C 45/14* (2006.01)
(52) U.S. Cl.
USPC ............ 264/132; 264/275; 264/135; 264/264
(58) Field of Classification Search
None
See application file for complete search history.

(56) References Cited

U.S. PATENT DOCUMENTS

| 3,864,143 | A | * | 2/1975 | Fantazier et al. ............. 430/295 |
| 4,214,028 | A | * | 7/1980 | Shortway et al. ............. 428/159 |
| 4,217,385 | A | * | 8/1980 | Shortway et al. ............. 428/159 |
| 4,248,922 | A | * | 2/1981 | Shortway et al. ............. 428/159 |
| 5,656,359 | A | * | 8/1997 | Hirota et al. ............... 428/195.1 |
| 2003/0017284 | A1 | * | 1/2003 | Watanabe et al. ............. 428/34.2 |
| 2012/0318859 | A1 | * | 12/2012 | Leser et al. .................. 229/403 |

FOREIGN PATENT DOCUMENTS

| EP | 0 659 647 A | 6/1995 |
| GB | 2 428 402 A | 1/2007 |
| JP | 53 141384 A | 12/1978 |
| JP | 2007 153359 A | 6/2007 |
| WO | 02/26484 A | 4/2002 |

OTHER PUBLICATIONS

International Search Report for PCT/FR2009/050766, dated Jan. 4, 2010.

* cited by examiner

*Primary Examiner* — Edmund H. Lee
(74) *Attorney, Agent, or Firm* — Heslin Rothenberg Farley & Mesiti P.C.

(57) ABSTRACT

According to the method:
- an IML label produced from a film of between 30 and 50 μm thick is obtained;
- on at least one face of the film, an area is printed with an ink or varnish;
- in the cavity of a mold, the film is arranged so that the printed area is not in contact with the mold;
- in the cavity equipped with the film, plastics material is injected simultaneously with an expansion agent, so that the printed area does not adhere to the melted plastics material. The expansion agent is trapped between the label and the plastics material, creating a raised effect in the printed area.

4 Claims, 1 Drawing Sheet

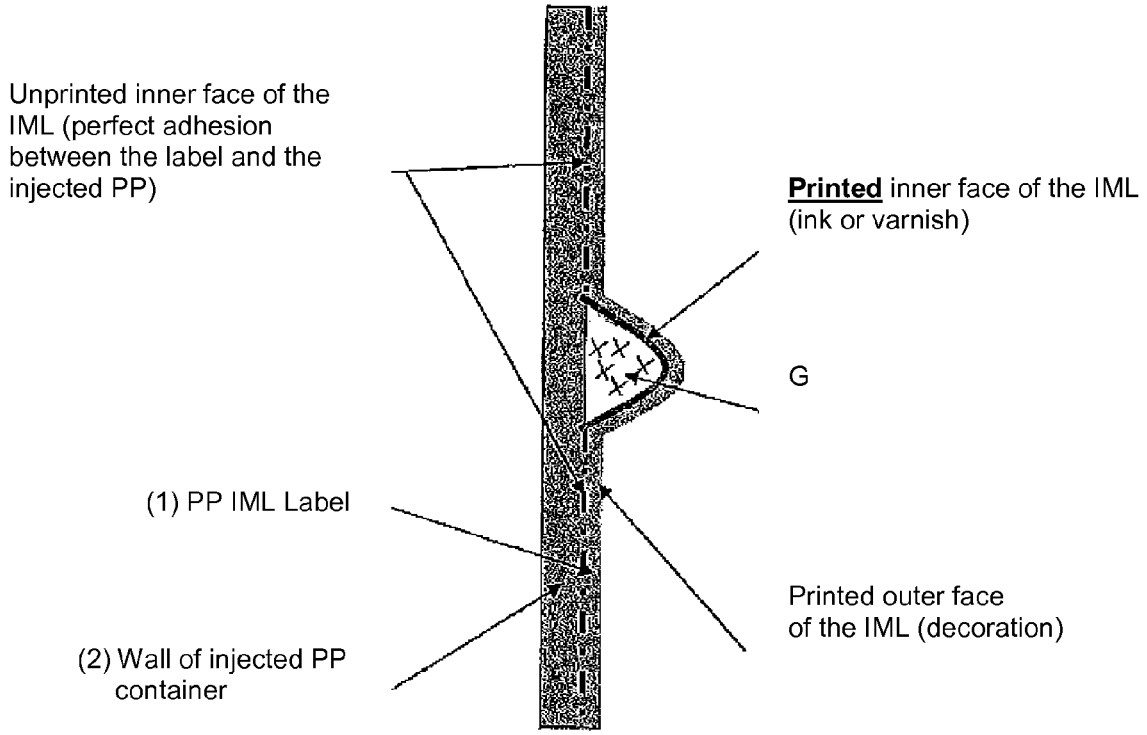

METHOD FOR PRODUCING AT LEAST ONE RAISED AREA ON A PLASTIC CONTAINER

CROSS REFERENCE TO RELATED APPLICATIONS

This application is a national stage filing under section 371 of International Application No. PCT/FR2009/050766, filed on Apr. 24, 2009, and published in French on Nov. 19, 2009, as WO2009/138677 and claims priority of French application No. 0852939 filed on Apr. 30, 2008, the entire disclosure of these applications being hereby incorporated herein by reference.

BACKGROUND ART

This invention relates to the technical sector of containers and packaging for the presentation and tasting of solid or liquid products.

The object of the invention is to produce plastic packaging or containers having one or more raised areas. Generally, in the technical field of rigid or semi-rigid plastic packaging, the raised area or areas are obtained by thermoforming. In a manner that is perfectly well-known to a person skilled in the art, thermoforming consists in heating the plastics material until it softens and in making use of this ductility to shape it in the cavity of a mould having the raised area or areas to be obtained. Under a cooling effect, the material solidifies enabling it to retain the desired shape.

Consequently, with this solution, the areas that appear raised on the outside of a container for example appear recessed on the inside of the said container, or conversely given that there is deformation of the material. In other words, this thermoforming solution does not allow any container with a completely smooth interior and an exterior having one or more raised or recessed areas to be obtained.

The aim of the invention is to overcome these drawbacks in a simple, reliable, effective and rational manner.

The problem that the invention proposes to solve is to produce a container of any geometrical shape whose interior is perfectly smooth, while all or part of the exterior may have one or more raised areas in the form of logos, drawings, writing, etc.

In order to achieve these aims, a method has been devised and perfected which, basically, uses a principle that is perfectly well-know to a person skilled in the art and is called IML, according to which a label generally made of polypropylene is directly placed in an injection mould. The label is embedded in the packaging by partially melting its inner face and generally serves to decorate all or part of the packaging.

BRIEF SUMMARY OF INVENTION

Starting with this known principle of IML, taking into account the problem to be solved, according to the invention, the method for producing at least one raised area on a plastic container, of any shape, is remarkable due to the combination of the following stages:

an IML label produced from a film of between 30 and 50 μm thick is obtained;
on at least one of the faces of the film, the area or areas are printed by means of an ink or varnish;
in the cavity of a mould, the film is arranged so that the printed area or areas is/are not in contact with the said mould;
in the cavity equipped with the film, the plastics material is injected simultaneously with an expansion agent, so that the said printed area(s) does/do not adhere to the melted plastics material, the said expansion agent being trapped between the label and the plastics material, creating a raised effect in the said printed area(s).

Advantageously, the film consists of layers of expanded white polypropylene.

In order to solve the problem of obtaining raised effects with the aim of obtaining a microalveolar type structure of the plastics material, the plastics material is injected according to the technology known by the trade mark of MUCELL®.

Advantageous results have been obtained with a film approximately 38 μm thick and having a density of approximately 550 kg/m$^3$.

This invention also concerns the containers resulting from implementing the method according to the invention, it being understood that this method applies to the production of any type of product produced by applying methods of injection, thermoforming, extrusion, etc.

BRIEF DESCRIPTION OF THE DRAWING FIGURES

Further details of the invention will emerge from the single FIGURE of drawings that illustrate the basic principle of the method according to the invention.

DETAILED DESCRIPTION

According to the invention, the desired raised area or areas to be obtained on a plastic container of any general shape whatsoever is/are obtained from an IML (1) label. This IML (1) label is made from a film of between 30 and 50 μm thick having a density of approximately 550 kg/m$^3$. Advantageous results have been obtained with a film approximately 38 μm thick.

According to an aspect of the invention, on at least one of the faces of the label (1), namely the back of the latter, an ink or varnish with the appropriate characteristics is printed over the area or areas that are to have a raised appearance. Printing is carried out by adopting any known industrial method, such as flexography, heliography, offset printing, etc. Advantageously, the front and back of a label are printed to obtain a better quality of decoration and raised appearance over the chosen areas. It will be remembered that these raised areas can be formed by drawings, logos, writing, etc.

Thus prepared, the IML labels are cut depending on the desired applications and transferred by any known and appropriate means such as robots, to be arranged in the cavity or cavities of a mould corresponding to the container to be obtained.

A plastics material (2), for example polypropylene, is then injected.

Surprisingly and unexpectedly, it emerged that the injection method known by the MUCELL® trade mark, in combination with an IML label having the above-mentioned characteristics, enables raised effects to be achieved over the printed area or areas of the label.

This injection method known by the MUCELL® trade mark is disclosed, for example, by the teaching of patent EP 0580777.

According to the teaching of this patent, an expansion agent (gas (G), for example) is injected at a first temperature and under a first pressure at which the expansion agent is a supercritical fluid. The mixture of material and fluid is transformed into a solution with a complete single phase. The temperature and pressure are then varied so as to obtain a super micro-cellular expanded material containing a large number of voids or alveoli appropriately distributed inside the said material.

This special injection method enables a micro-alveolar or micro-cellular internal structure to be obtained it being understood that, not only do the inked areas of the IML label not adhere to the melted polypropylene, but the expansion agent is trapped between the wall of the container and the IML label creating the desired raised effect in the said inked areas. This results in particularly attractive visual effects.

Without thus departing from the scope of the invention, it will be observed that not only can these raised areas have an aesthetic function but they can also have a technical effect. For example, ridges or small bands can be printed on the back of the IML label which, after injection under the conditions indicated and demoulding, will have a raised appearance creating a thermal barrier, taking into account the injected gas or other expansion agent.

According to the invention, it is also possible to obtain a raised effect, in a very flexible and very precise manner, in order to produce Braille on the parts resulting from this method.

Without thus departing from the scope of the invention, the method can be used with other materials apart from PP, such as PS, PET, etc.

Furthermore, the injection method can be replaced by a thermoforming or extrusion method of the plastics material in question.

The advantages emerge clearly from the description, emphasizing in particular:
ease of use;
reduced costs;
quality of the result obtained;
possibility of obtaining a container of any geometrical shape whatsoever with a completely smooth interior, the raised area or areas appearing solely on the outside;
possibility of obtaining a container with insulating, notably isothermic, characteristics;
possibility of combating counterfeits, since the type of raised effect is very difficult to reproduce;
possibility of changing the graphics or other desired raised area easily and quickly.

The invention claimed is:

1. Method for producing at least one raised area on a plastic container, comprising:
   obtaining an IML label produced from a film of between 30 and 50 µm thick;
   printing an area on at least one face of the film with an ink or varnish;
   arranging the film in a cavity of a mould so that the printed area is not in contact with the mould;
   in the cavity equipped with the film, injecting plastics material and simultaneously injecting an expansion agent as a supercritical fluid such that a mixture of the plastics material and the fluid is transformed into a solution with a complete single phase, and varying temperature and pressure to obtain a micro-cellular internal structure in which said printed area does not adhere to melted plastics material, the expansion agent being trapped between the label and the plastics material, creating a raised effect in the printed area.

2. Method according to claim 1, wherein the film comprises layers of expanded white polypropylene.

3. Method according to claim 1, wherein the film is approximately 38 µm thick.

4. Method according to claim 1, wherein the film has a density of approximately 550 kg/m$^3$.

* * * * *

UNITED STATES PATENT AND TRADEMARK OFFICE
CERTIFICATE OF CORRECTION

PATENT NO.         : 8,557,153 B2
APPLICATION NO.    : 12/989894
DATED              : October 15, 2013
INVENTOR(S)        : Yannick Ains It is certified that error appears in the above-identified patent and that said Letters Patent is hereby corrected as shown below:

In the Claims:

Column 4, Line 14: Claim 1, Delete "filmwith" and insert --film with--

Signed and Sealed this
Seventeenth Day of December, 2013

Margaret A. Focarino
*Commissioner for Patents of the United States Patent and Trademark Office*